O. M. FARRAND.
COMBINATION OR KEYLESS LOCK.
APPLICATION FILED SEPT. 17, 1907.

929,924.

Patented Aug. 3, 1909.
4 SHEETS—SHEET 1.

WITNESSES:
Fred White
René Bruine

INVENTOR:
Oliver M. Farrand,
By Attorneys,

O. M. FARRAND.
COMBINATION OR KEYLESS LOCK.
APPLICATION FILED SEPT. 17, 1907.
929,924.
Patented Aug. 3, 1909.
4 SHEETS—SHEET 2.
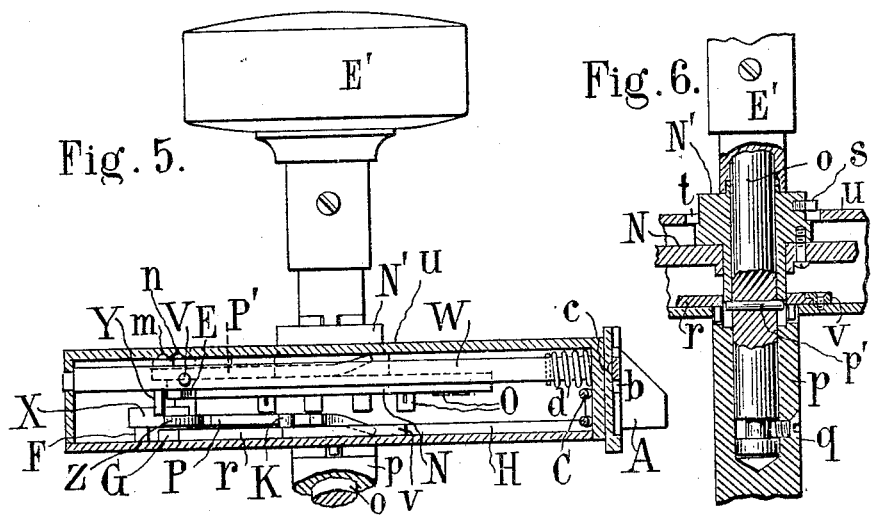
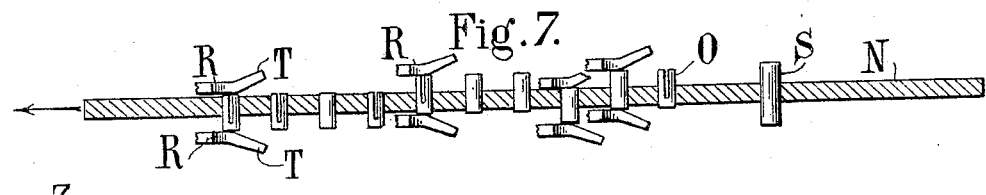
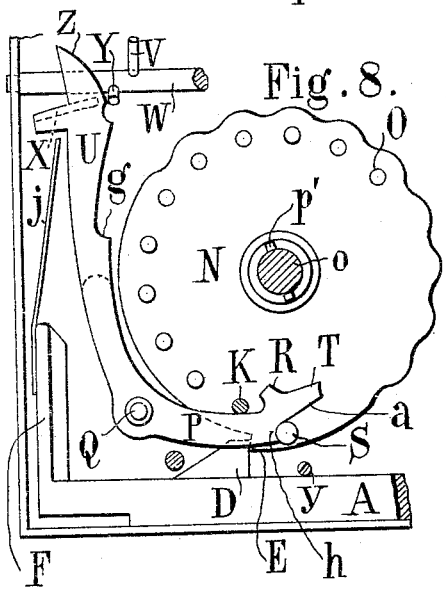
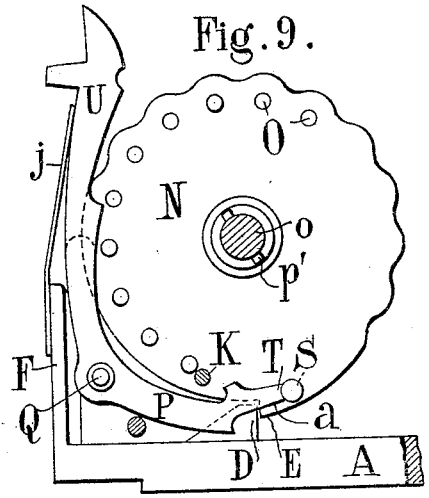
WITNESSES:
INVENTOR:
Oliver M. Farrand,
By Attorneys

O. M. FARRAND.
COMBINATION OR KEYLESS LOCK.
APPLICATION FILED SEPT. 17, 1907.

929,924.

Patented Aug. 3, 1909.
4 SHEETS—SHEET 3.

WITNESSES:
Fred White
René Bruine

INVENTOR
Oliver M. Farrand.
By Attorneys,

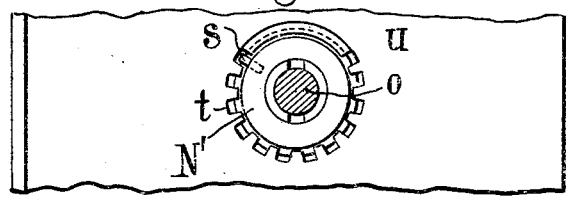
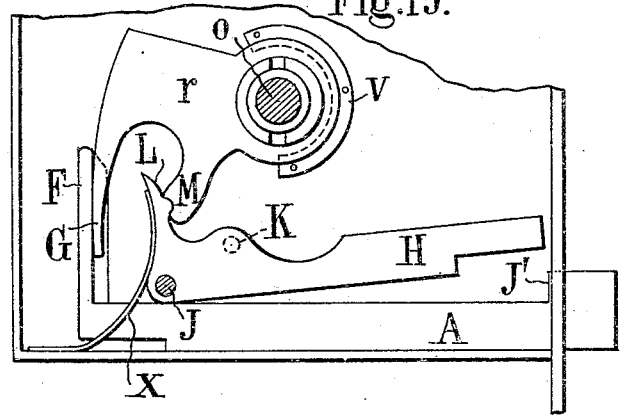
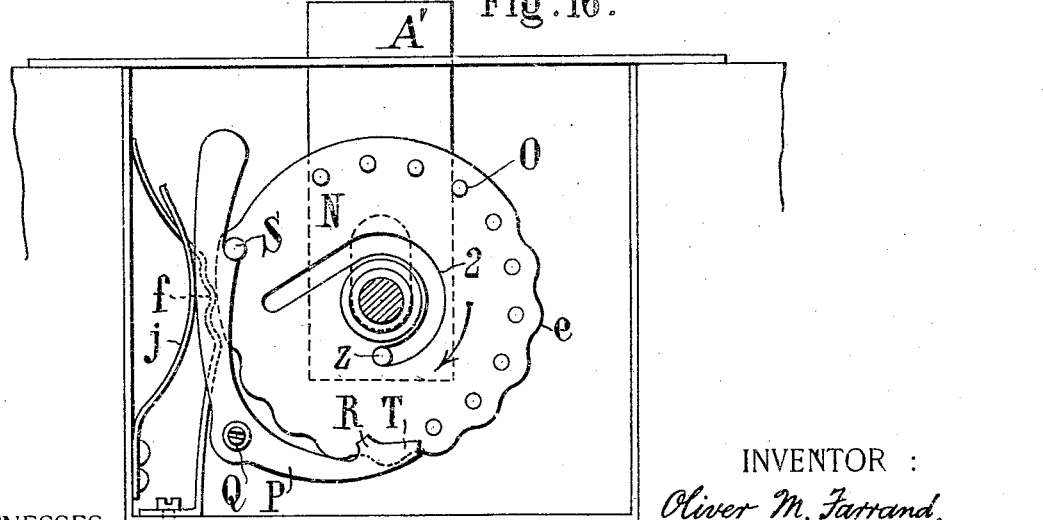

UNITED STATES PATENT OFFICE.

OLIVER M. FARRAND, OF NEW YORK, N. Y.

COMBINATION OR KEYLESS LOCK.

No. 929,924.  Specification of Letters Patent.  Patented Aug. 3, 1909.

Application filed September 17, 1907. Serial No. 393,333.

*To all whom it may concern:*

Be it known that I, OLIVER M. FARRAND, a citizen of the United States, residing in the borough of Manhattan, city, county, and State of New York, have invented certain new and useful Improvements in Combination or Keyless Locks, of which the following is a specification.

This invention provides certain improvements in keyless or combination locks adapted for use wherever locks are used, and adapted to be operated by the sense of touch, so that they may be operated by a deaf or a blind person, or in situations where it is not convenient to provide a light.

The novel features are pointed out in the claims hereinafter.

The accompanying drawings illustrate embodiments of the invention.

Figure 1:
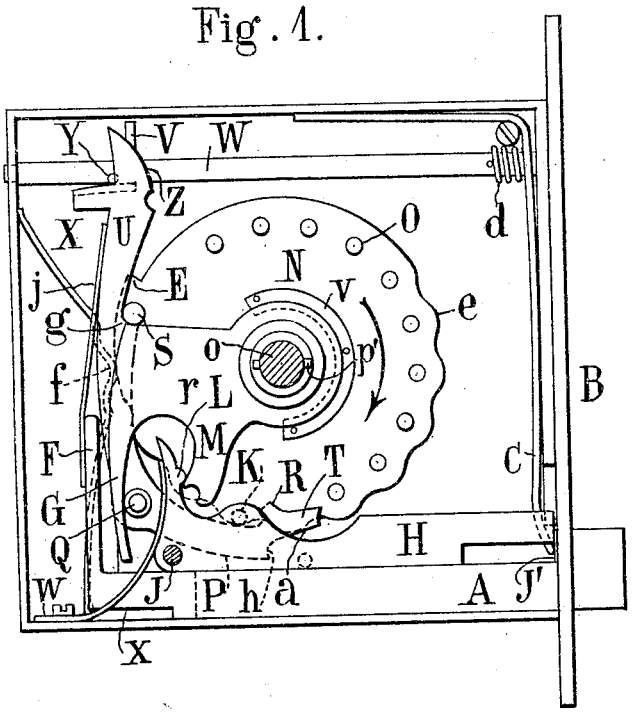
Figure 2:
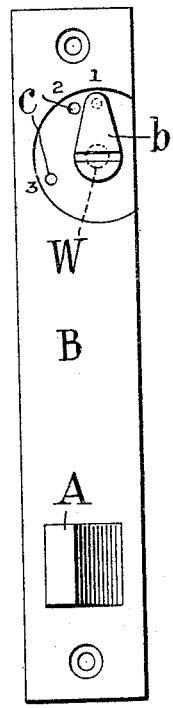
Figure 3:
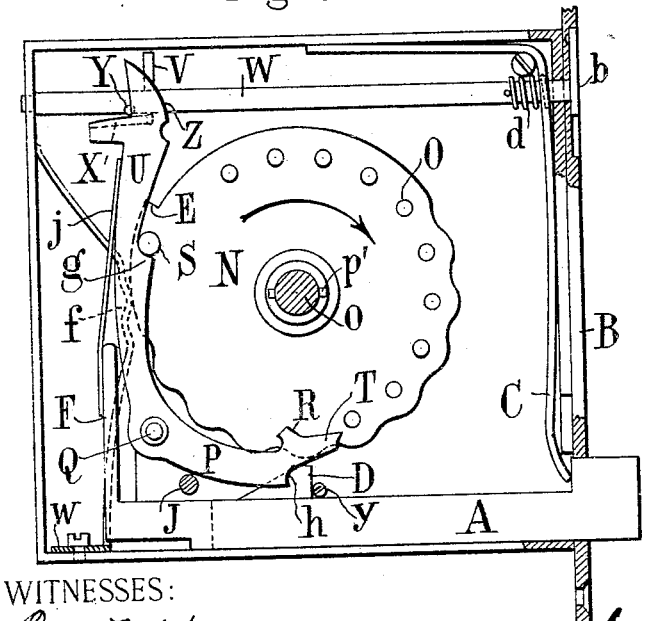
Figure 4:
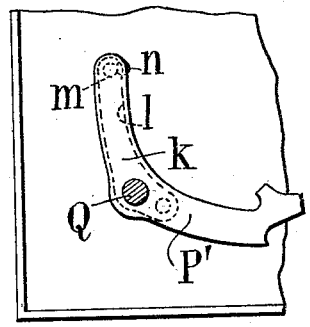
Figure 10:
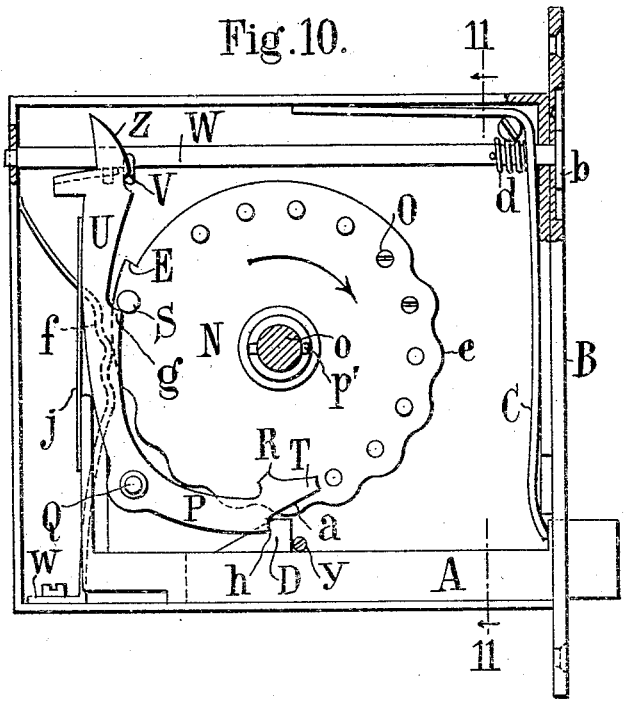
Figure 11:
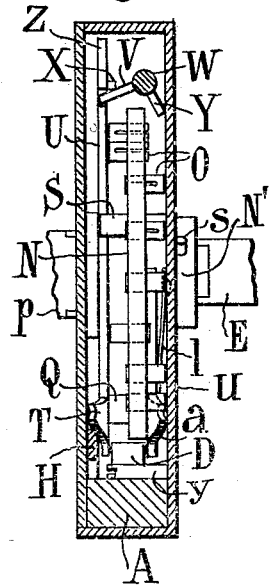
Figure 12:
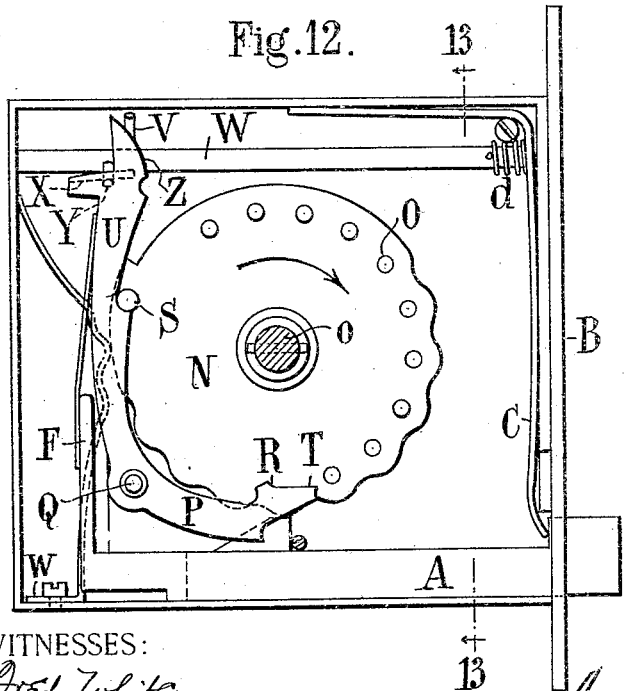
Figure 13:
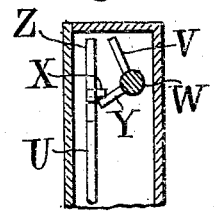

Figure 1 is a view from the inner side of the lock, the inner plate being removed and the parts standing in their normal locked position. Fig. 2 is an edge elevation of the same. Fig. 3 is an elevation similar to Fig. 1 with those parts removed which are used to open the lock with the inside knob (without the necessity of working the combination). Fig. 4 is an elevation of a member at the rear of the lock. Fig. 5 is a horizontal sectional view of the casing with the internal parts of the lock in plan. Fig. 6 is a horizontal section through the spindle and adjacent parts. Fig. 7 is a development of a circular section through the stops or pins whose positions determine the combination. Fig. 8 is a view similar to Fig. 3 showing the parts at the end of a movement in which the combination has been correctly worked and the bolt drawn. Fig. 9 is a similar view showing the combination incorrectly worked so that the bolt cannot be withdrawn. Fig. 10 is a face elevation with the parts in position for changing the combination. Fig. 11 is a section of Fig. 10 approximately on the line 11—11. Figs. 12 and 13 are views similar to Figs. 10 and 11 respectively with the parts in such a position that although the combination cannot be changed by turning the knob as in the position of Figs. 10 and 11, yet it is not necessary that one should know and work the combination before being able to bring the parts in the position of Figs. 10 and 11 so as to be able to change them. Fig. 14 is an external view of the central portion of the rear or outer plate of the lock. Fig. 15 is a face elevation of the mechanism for withdrawing the bolt from the inner side of the lock in a position slightly advanced beyond that shown in Fig. 1. Fig. 16 is an inner face elevation of a "dead" lock, that is to say one in which the bolt is operated positively in each direction and not by means of a spring.

Referring to the embodiment of the invention illustrated, the bolt A, casing B, and spring C for throwing the bolt, are of the usual or any suitable design. For withdrawing the bolt it is provided with a projection D which is in the path of a projection E which is rotated with the outer or combination knob E′ as hereinafter explained. When the combination is worked correctly, the projection E engages the projection D and withdraws the bolt. If the combination is not correctly worked, the projection E is stopped in its movement toward the projection D so that it cannot withdraw the bolt. A second projection F is provided on the bolt for engagement by an arm G attached to the spindle $p$ of the inner or non-combination knob to withdraw the bolt. The bolt is ordinarily locked in its outer position by a member H pivoted at J, adapted when lowered (Fig. 1) to engage a shoulder J′ near the outer end of the bolt to prevent its withdrawal, and when raised (Fig. 15) to leave the bolt free to move inward. This locking member H is lifted, when the combination is correctly worked from the outside, by means of a member P hereinafter referred to acting upon a pin K projecting laterally from the member H; and when the lock is operated from the inside, through an arm L engaged by an arm M moved by the inside knob.

Rotating with the projection or arm E and forming in fact in the case illustrated the connection of this projection E with the spindle, is a plate N carrying a number of stops O consisting of pins projecting through the plate, and held frictionally in the apertures of the plate through which they pass. A good frictional contact, but one which at the same time permits of movement of the pins, is effected by forming the pins of suitably shaped wires or rods bent double in the manner shown in Fig. 7. Embracing the edge of the plate near its low point, is a forked device consisting of a pair of members P P′, fastened to each other by means of a shaft Q the ends of which are pivoted in the front and rear walls of the lock. Each of these members P P' has near its end a projecting member R with an inclined forward edge, the corresponding portions of the two members P P' being separated from each other by a space slightly greater than the length of the pins O. The location of the inclined edges of the projecting members R is such that when the bolt is thrown as in Fig. 1, any pin O which projects into the plane of the member P or P' will in the rotation of the plate N ride upon the inclined edge of the projecting member R and depress the entire forked device. Now rotating with the plate N and preferably mounted thereon at a suitable point, is a pin S which comes into position opposite the member P after the several combination pins O have passed it. If in such passing the member P has not been depressed, then the pin S will ride freely under it (Fig. 8) at least for a sufficient distance to permit the projection E to engage the bolt and draw the same back. If, however, the member P has been depressed by any one of the combination pins O riding upon the inclined edge of the projecting member R of the member P or P', then the pin S will meet the notched end of the member P (Fig. 9) and the bolt operating projection E will be prevented from moving farther and the bolt cannot be drawn. The combination pins O are arranged to project to one side and then to the other in irregular succession, as indicated most clearly in Fig. 7, and in order that they shall avoid engagement with the inclined edge of the projecting member R of first the member P and then the member P' according to the positions of the successive pins, the disk N which carries them is given axial movements forward and back at proper intervals. Fig. 7 represents diagrammatically the successive changes in the relative position of the stop carrying member N and the members R between which the stops are moved by a succession of rotary and axial movements.

In order to change the combination, the arrangement of the pins O is changed by forcing one or more of them through the plate to extend on the side opposite that on which they previously extended. The invention provides a very simple method of shifting the pins from one side to the other by utilizing the end portions T of the members P and P', these end portions being slightly flared to ease their engagement with the ends of the pins. In the operation of the members P P' by means of the pins O to draw the bolt it will be observed that the pins bear upon the upper edges of the members P so as to move these members in a vertical plane. In the shifting of the pins O, to change the combination, it is the inner faces of the portions T which engage the ends of the pins and shift them horizontally. Ordinarily the bolt being thrown, the pins move in a line above the part T, and serve either to depress the members P P', or to pass without engagement and without noise. In order to swing the parts T up to a position where the ends of the pins O may engage their inner faces (Fig. 10), a special mechanism is provided which thus controls or renders operative the combination changing mechanism. When this combination changing mechanism is rendered operative, that is to say when the parts T are swung up in the line of movement of the pins O, then the successive rotation and axial movement of the plate N will bring the pins O to the position necessary for the corresponding combination. For example no matter what the position of the pins in the beginning, if we suppose (Fig. 7) that the parts T are held fast while the plate N is first rotated four steps and then pushed inward and then rotated three steps, and then pulled outward and rotated one step, and then pushed inward and rotated two steps, the pins will be brought to the position of the combination "out, 4, 3, 1, 2," that is to say in afterward working the combination, in order to get the pins past the portions R the knob will be first pulled outward and then the successive movements 4, 3, 1 and 2 effected, with corresponding axial shifts. The swinging of the parts T up to the line of movement of the pins O is effected through an arm U fastened to the member P and extending upward from the pivot to a point above the plate N. This member U is operated by an arm V on a shaft W running lengthwise of the lock. It is desirable, however, to prevent unauthorized persons from changing the combination, and therefore the shaft W is prevented from rotating until the combination has been correctly worked. For this purpose the member U is provided with a transverse shoulder X shown best in Figs. 11 and 13, upon which normally rests another arm Y of the shaft W as in Fig. 1. It will be understood that the arm V effects the movement of the member U by sliding over the inclined edge Z of the latter as the shaft W is turned. In order to release the arm Y and permit the turning of the shaft W, the end of the inner member T is provided on its under side with an inclined edge a which is engaged by the pin S when, the combination having been correctly worked, the pin S is enabled to get under the end of the member P. This upward movement of the member P (Fig. 8) is sufficient to swing the shoulder X beyond the line of the arm Y. With the parts in this position the arm Y may move downward and the shaft W may be operated accordingly. The shaft W may be turned at least sufficiently to bring the arm Y below the shoulder X while the knob is held in the position of Fig. 8. The shaft W turned to this intermediate position and the knob turned back to the starting point, is the position illustrated in Figs. 12 and 13.

The end of the shaft W preferably projects through the outer edge of the lock, the edge which is concealed when the door is shut, and is provided with any suitable means for turning it, such as the notched head $b$ (Fig. 2) which is provided with an arm carrying on its under face a pin adapted to snap into depressions $c$ under the influence of the spiral spring $d$ within the casing pressing the shaft W inward, and thus to hold the shaft in any one of the three important positions numbered respectively 1, 2 and 3.

The operation of changing the combination is as follows:—The combination is correctly worked and the parts brought to the position of Fig. 8. Then with a screwdriver or the edge of a coin or the like, the shaft W is turned to the intermediate position No. 2, bringing the arm Y below the plane of the projection X. The knob and plate N are then turned back to the starting position and the parts are in the position of Figs. 12 and 13. The shaft W is then turned to the most advanced position No. 3, bringing the arm V against the edge of the member U to force the latter back and to lift the end portions T of the members P P′ into the line of the combination pins O. By turning and shifting the knob as described, the pins may then be made to assume positions for any desired combination. It is important then to try the combination in order to make sure that the operator has it correctly in his mind or written, before he turns the shaft W back to its normal position; otherwise he would neither know the combination nor be able to control it. The intermediate position of the shaft W (Fig. 12) leaves the lock operative in the ordinary way and at the same time permits the rotation of the shaft W to the position which renders the combination changing means operative; so that by turning the shaft back to this intermediate position the operator may try the lock to determine if he has the correct combination. If so, of course he turns the shaft W back to normal position No. 1.

For counting the successive steps in the rotation of the plate N, it is provided with teeth $e$ at intervals corresponding with the intervals between the juxtaposition of the pins O and projecting members R, and a spring $f$ is arranged to snap or click over the teeth $e$ sufficiently to produce a slight jar which can be felt by the hand of the operator, even though it may be so slight as to make no noise.

Stops are provided for limiting the rotation of the plate N, these stops being preferably in the form of shoulders $g$ $h$ upon the members U and P respectively and lying in the path of the pin S.

After the lock has been properly opened, if the operator releases the knob the spring C of the bolt immediately throws the bolt out, at the same time (by reason of the engagement of the projection E with projection D, as in Figs. 8 and 9) turning the plate N backward a proper distance, and the stops T are immediately thrown down into the path of the pin S by the action of the spring $j$, which is fastened to the projection F at the rear end of the bolt, and which bears against the member U to swing the latter in and to swing the stops T down. The lock cannot then be reopened except by turning the knob to the starting point and working the combination again.

The member P′ at the rear of the plate N is extended beyond the shaft Q in the form of a short arm $k$ (Fig. 4) approximately parallel with the lower portion of the member U. In the rear of the arm $k$ is a flat spring $l$, shown in edge view in Fig. 11, fastened at its lower end to the member P′ and having at its upper end a rearward projection $m$ adapted to spring into either one of two depressions $n$ in the rear wall of the lock, and to press always against the rear face of the lock with a certain amount of friction. This spring or impositive lock serves to hold the parts R and T in the positions to which they are set. For example if one of the combination pins rides on the edge of one of the members R and throws the part T down in position to stop the movement of the pin S, the part T will be held in this position by the spring $l$. Likewise in the normal position of the parts the spring $l$ stands as in Fig. 4. When the pin S rides under the edge $a$ of the member P to throw it up to the combination changing position, the projection on the rear of the spring $l$ rides on the flat face of the rear plate of the lock, so that when the knob is released and the bolt is thrown forward, the spring $j$ will press the arm U inward until the impositive lock stops it in the position of Fig. 4. When the knob is turned back to the starting point, the pins O which have passed the projecting member R strike its rear edge and throw the members P P′ down still farther to their lowermost position. But just before the termination of the backward movement, the pin S strikes the edge of the member U, throwing it out and moving the members P P′ up to their normal position Fig. 1.

Various arrangements of the knobs and their spindles may be utilized for securing rotary movements thereof independently of each other, and for connecting them to the intermediate mechanisms between the knobs and the bolt. In the arrangement shown in Fig. 6 the outer knob spindle $o$ extends through the lock and into the hollow spindle $p$ of the inner knob, the two parts being fastened together by a screw $q$ entering a circular groove in the end of the outer spindle $o$. The member $r$ which carries the two arms G and M of the inner knob is engaged by a toothed engagement with the spindle $p$. There is a similar toothed engagement of the outer spindle or knob E' with the hub N' of the disk N. The hub N' carries also a projecting pin $s$, and this pin registers with one or another of the notches $t$ (Fig. 14) in the outer plate $u$ of the lock whenever the relative positions of the combination pins O with the member R is such that the axial shifting movement should take place. This pin and these notches prevent any accidental making of the axial and the rotative movement simultaneously, and insures the working of the combination accurately according to the spaces between the pins. The desired amount of axial play of the spindle $o$ is permitted by the toothed engagement thereof with the member $r$, and the member $r$ is held fixed against axial movement by an overhanging member $v$ attached to the front plate and extending circularly around the hub of the arm $r$, its position being indicated in Figs. 1 and 15. The plate N is held on the spindle $o$ by means of a transverse pin $p'$ engaging the end of the hub of the plate N.

The spring $f$ is provided with a base portion $w$ fastened to the bottom plate of the lock, and which has another wing $x$ extending up to press against the rear of the locking member H to hold the latter down in its normal locking position. The pin $y$ is a guide for the bolt A.

The dead bolt arrangement of Fig. 16 is similar to that above described, except that the bolt A' is moved in or out by means of a pin $z$ projecting laterally from one face of it, and through a cam-slot 2 in the plate N carrying the combination pins and other parts as before described. The cam-slot 2 is circular throughout the greater portion of its length, so that there is no possible movement of the bolt until the combination pins O have all passed the projecting members R. If the pins pass the projecting members R without striking them, then the plate N may continue to turn, and the tangent portion of the cam slot will depress the pin $z$ and draw the bolt A'. The throwing of the bolt to the locking position will only take place upon the turning of the knob back to the starting position. For changing the combination in this case, the shaft Q which carries the parts R and T extends through to the inner side of the door and is there slotted to receive a screwdriver or similar tool, whereby the shaft and the arms carried thereby may be turned to the combination changing position. The holding of the members P P' in their several positions is effected by an impositive locking arrangement similar to that shown in Fig. 4. In addition a third depression such as $m$ is provided for holding the parts in the combination changing position, and this is preferably made deeper than the others so as to hold more firmly.

What I claim is:—

1. A combination lock having a casing including an outside edge plate and a permanently attached means located in said casing for changing the combination, said plate having a recess in its outer face and said combination-changing means having a portion extended through said plate and an operating device lying entirely in said recess so as to avoid interference with the opening and closing of the door to which the lock is applied, and so as to be accessible without a special tool when the door is opened, and to be inaccessible from either side of the door when it is closed.

2. A combination lock having a casing including an edge plate and a normally inoperative combination-changing means located in said casing, said plate having a recess in its outer face, and means having an operating device lying within said recess for rendering the combination-changing means operative.

3. A combination lock including a carrier, a series of axially movable pins carried thereby and whose positions determine the combination, and means for changing their positions by movements of the knob alternately axial and rotary.

4. A combination lock including a bolt, a normally stationary device, and a series of members the positions of which determine the combination, and which are movable in succession past said normally stationary device, the engagement or nonengagement of said members with said device serving to make impossible or possible the withdrawal of the bolt.

5. A combination lock including a plate, a series of pins carried thereby and adapted to project to one side or the other and to be held in either position, and a pair of members adapted to effect the lateral shifting of said pins to one side or the other as said pins are passed between said members.

6. A combination lock including a plate N, a series of pins O carried thereby and adapted to project at one side or the other of the plate and to be held impositively in either position, and a pair of members T constructed to embrace said plate, so that as the plate is rotated the pins pass between the members T, and as the plate is shifted axially the pins are thrown to one side or the other of said plate.

7. A combination lock including a pair of members normally out of operative position, a carrier, a series of pins carried thereby and adapted to be engaged by said members when the latter are in operative position and to be shifted to change the combination, and a projection S also carried by said carrier and adapted to shift said members to operative position after the combination has been correctly worked.

8. A combination lock including means for drawing the bolt upon the working of the correct combination, a device normally in position to prevent a change of the combination but adapted to be shifted to an operative position to permit the changing of the combination, and means accessible at the edge of the lock for effecting a shift of said device to operative position.

9. A combination lock including a pair of members, a carrier, a series of pins carried thereby and adapted to be engaged by said members when the latter are in operative position and to be thus moved to change the combination, an arm connected with said members, and a shaft which may be turned from the outside of the lock, said shaft operating said arm to shift said members to their operative position.

10. A combination lock including means for drawing the bolt upon the working of the correct combination, a device for permitting the change of the combination, means accessible from the outside of the lock for shifting said device to its operative position, said means being normally inoperative and being rendered operative only upon correct working of the combination.

11. A combination lock including a pair of members, a carrier, a series of pins carried thereby and adapted to be engaged thereby when said members are in their operative position to permit the changing of the combination, an arm U connected with said members, a shaft W operable from outside the lock, an arm V on said shaft adapted when the shaft is turned to engage the members U and shift the members to operative position, a pair of stops on said member U and said shaft respectively normally preventing the turning of said shaft W, and a projection S on said carrier adapted when the combination is worked to swing the members sufficiently to permit one of the stops on the member U and shaft W respectively to pass the other so that the shaft W may be operated and the combination changed.

12. A combination lock including a shaft W controlling the changing of the combination and adapted to be turned to a normal, an intermediate or an advanced position, combination changing means which are set in operative position by the movement of the shaft to the advanced position and which are held in inoperative position in any other position of the shaft, and means for preventing the movement of the shaft from its normal to the advanced position until the combination has been correctly worked, but not from the intermediate to the advanced position.

13. A combination lock including a knob, a plurality of pins whose positions determine the combination, a single plate carrying said pins, and a device adapted to be engaged by said pins and to shift them from one position to another by axial movements of the knob.

14. A combination lock including a knob, a movable carrier operated by the knob, and a series of axially adjustable members carried thereby and whose axial positions determine the combination.

15. A combination lock having an outside knob and an inside knob and including a member engaging the bolt to prevent its withdrawal, and separate means for removing said member from the path of the bolt upon the working of the combination with the outside knob and upon the simple rotation of the inside knob respectively.

16. A combination lock including a series of pins, a carrier for said pins and having a rotary and axial movement in unlocking the lock, and a member normally permitting the withdrawal of the bolt but adapted when engaged by one of said pins to be moved to a position to prevent withdrawal of the bolt.

17. A combination lock including a series of pins, a carrier for said pins and having a rotary and axial movement in unlocking the lock, a member normally permitting the withdrawal of the bolt but adapted when engaged by one of said pins to be moved to a position to prevent withdrawal of the bolt, said member being adapted to be thrown to the locking position by engagement with said pins when the knob is released after working the combination.

18. A combination lock including a pair of spindles fastened together so that each partakes of the axial movement of the other but free to rotate relatively to each other, a plate r for positively withdrawing the bolt connected by a toothed connection with one of said shafts, and a plate N for working the combination and thus withdrawing the bolt connected with the other shaft, the plate r being fixed against axial movement, and the plate N being free to move axially.

In witness whereof, I have hereunto signed my name in the presence of two subscribing witnesses.

OLIVER M. FARRAND.

Witnesses:
  Domingo A. Usina,
  Fred White.